United States Patent
Kelly et al.

(10) Patent No.: US 9,226,017 B2
(45) Date of Patent: Dec. 29, 2015

(54) APPARATUS FOR RECEIVING A DIGITAL INFORMATION SIGNAL COMPRISING A FIRST VIDEO SIGNAL PRODUCING IMAGES OF A FIRST SIZE, AND A SECOND VIDEO SIGNAL PRODUCING IMAGES OF A SECOND SIZE SMALLER THAN THE FIRST SIZE

(75) Inventors: Declan Patrick Kelly, Eindhoven (NL); Wilhelmus Jacobus Van Gestel, Eindhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1047 days.

(21) Appl. No.: 12/962,733

(22) Filed: Dec. 8, 2010

(65) Prior Publication Data
US 2011/0075032 A1    Mar. 31, 2011

Related U.S. Application Data

(63) Continuation of application No. 10/528,933, filed on Mar. 23, 2005, now Pat. No. 7,865,058.

(30) Foreign Application Priority Data

Sep. 26, 2002 (EP) .................................. 02079057

(51) Int. Cl.
*H04N 9/80* (2006.01)
*H04N 21/431* (2011.01)
(Continued)

(52) U.S. Cl.
CPC ......... *H04N 21/4316* (2013.01); *H04N 5/4401* (2013.01); *H04N 5/45* (2013.01); *H04N 21/2362* (2013.01); *H04N 21/6547* (2013.01)

(58) Field of Classification Search
CPC .. H04N 5/45; H04N 21/6547; H04N 21/4316
USPC ........................... 386/337–341; 348/563–568
See application file for complete search history.

(56) References Cited

U.S. PATENT DOCUMENTS

4,998,171 A * 3/1991 Kim et al. ..................... 348/565
5,598,222 A   1/1997 Lane
(Continued)

FOREIGN PATENT DOCUMENTS

EP    0810603 A1    3/1997
EP    1051039 A2    8/2000
(Continued)

OTHER PUBLICATIONS

The "ISO/IEC 13818-2:2000(e)" standard; 2000.
(Continued)

*Primary Examiner* — David Harvey

(57) ABSTRACT

An apparatus includes inputs configured to receive first and second video signals. The first video signal represents a sequence of images having a first size, and the second video signal representing a sequence of images having a second size, the second size being smaller then the first size of the images. The apparatus further includes a combiner configured to combine the first and second video signals so as to obtain a composite video signal suitable for displaying on a display unit. The combiner combines the first and second video signal while the size of the images corresponding to the second video signal remains unchanged.

38 Claims, 1 Drawing Sheet

Figure 1:
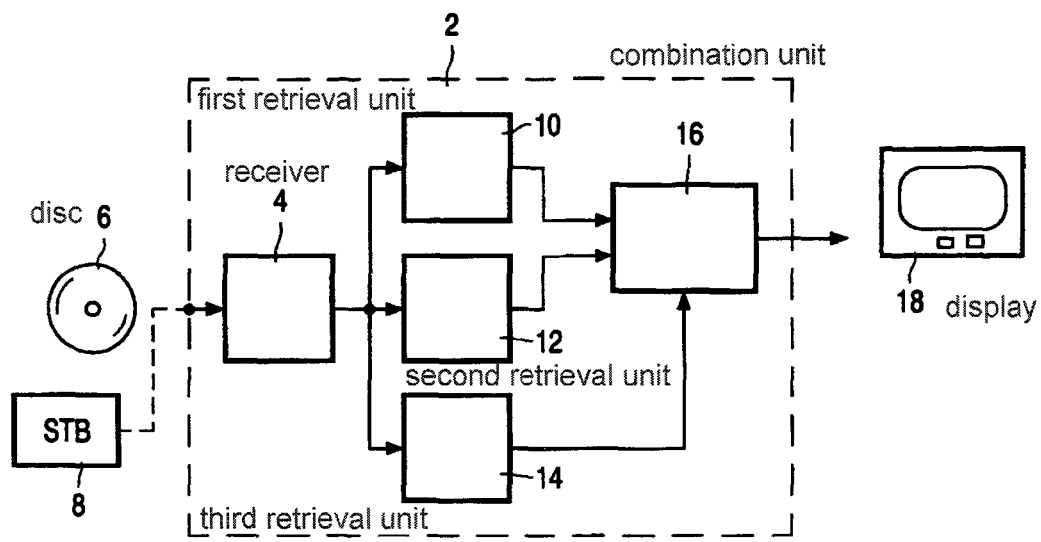

(51) Int. Cl.
*H04N 5/44* (2011.01)
*H04N 5/45* (2011.01)
*H04N 21/2362* (2011.01)
*H04N 21/6547* (2011.01)

(56) References Cited

U.S. PATENT DOCUMENTS

| | | | |
|---|---|---|---|
| 5,654,805 A * | 8/1997 | Boon | 382/232 |
| 5,784,528 A * | 7/1998 | Yamane et al. | 386/329 |
| 5,907,659 A * | 5/1999 | Yamauchi et al. | 386/245 |
| 5,995,146 A | 11/1999 | Rasmussen | |
| 6,069,669 A | 5/2000 | Park et al. | |
| 6,070,236 A | 5/2000 | Winter | |
| 6,075,906 A | 6/2000 | Fenwick et al. | |
| 6,246,401 B1 * | 6/2001 | Setogawa et al. | 715/723 |
| 6,307,597 B1 * | 10/2001 | Patton et al. | 348/565 |
| 6,415,101 B1 | 7/2002 | Decarmo et al. | |
| 6,556,252 B1 * | 4/2003 | Kim | 348/565 |
| 6,658,160 B1 * | 12/2003 | Winter et al. | 382/245 |
| 6,741,617 B2 | 5/2004 | Rosengren et al. | |
| 6,771,278 B2 | 8/2004 | Shigeta | |
| 6,778,224 B2 | 8/2004 | Dagtas et al. | |
| 6,798,981 B1 * | 9/2004 | Yamauchi et al. | 386/334 |
| 7,231,603 B2 | 6/2007 | Matsumoto | |
| 7,283,104 B2 * | 10/2007 | Kim et al. | 345/9 |
| 7,327,941 B1 | 2/2008 | Ando et al. | 386/239 |
| 7,471,834 B2 | 12/2008 | Sull et al. | |
| 7,865,058 B2 * | 1/2011 | Kelly et al. | 348/565 |
| 2001/0048481 A1 | 12/2001 | Hatano et al. | |
| 2002/0026642 A1 * | 2/2002 | Augenbraun et al. | 725/109 |
| 2002/0034375 A1 | 3/2002 | Suda | |
| 2002/0035575 A1 * | 3/2002 | Taira et al. | 707/200 |
| 2002/0047914 A1 | 4/2002 | Rosengren et al. | |
| 2002/0047918 A1 | 4/2002 | Sullivan | |
| 2002/0057897 A1 * | 5/2002 | Yamaguchi | 386/46 |
| 2002/0114395 A1 * | 8/2002 | Owen et al. | 375/240.18 |
| 2002/0120498 A1 | 8/2002 | Gordon et al. | |
| 2002/0140862 A1 | 10/2002 | Dimitrova et al. | |
| 2002/0176508 A1 | 11/2002 | Boyce et al. | |
| 2002/0186961 A1 * | 12/2002 | Kikuchi et al. | 386/98 |
| 2003/0026423 A1 | 2/2003 | Unger et al. | |
| 2003/0219233 A1 * | 11/2003 | Kimura | 386/95 |
| 2009/0016438 A1 * | 1/2009 | McDade et al. | 375/240.16 |

FOREIGN PATENT DOCUMENTS

| | | |
|---|---|---|
| JP | 04313984 A | 5/1992 |
| JP | 10215409 A | 8/1998 |
| JP | 10241262 A | 11/1998 |
| JP | 20000034697 A | 6/2000 |
| JP | 2000209177 A | 7/2000 |
| JP | 2001148816 A | 5/2001 |
| JP | 2001309350 A | 11/2001 |
| KR | 2001004940 | 0/2001 |
| WO | 0105144 A1 | 1/2001 |
| WO | 0247393 A1 | 6/2002 |

OTHER PUBLICATIONS

Machine translation of Korean application #KR2001004940 to Jo.

* cited by examiner

APPARATUS FOR RECEIVING A DIGITAL INFORMATION SIGNAL COMPRISING A FIRST VIDEO SIGNAL PRODUCING IMAGES OF A FIRST SIZE, AND A SECOND VIDEO SIGNAL PRODUCING IMAGES OF A SECOND SIZE SMALLER THAN THE FIRST SIZE

This is a Continuation of prior application Ser. No. 10/528,933 filed Mar. 23, 2005 and is incorporated by reference herein.

The invention relates to an apparatus for receiving a digital information signal comprising at least a first and second video signal, said apparatus comprises:

receiving means for receiving said digital information signal;

first retrieval means for retrieving said first video signal from the digital information signal;

second retrieval means for retrieving said second video signal from the digital information signal;

signal combination means for combining said first and second video signal so as to obtain a composite video signal suitable for displaying on a display unit.

The invention further relates to record carrier carrying a digital information signal and an apparatus for providing a digital information signal.

An arrangement defined above is commonly known. Such an arrangement, for example a digital TV, comprises the feature Picture in Picture (PIP) or Split-screen. With this feature it is possible to view simultaneously two different broadcast programs. Both programs are received with full resolution. The bandwidth of the input has to be two times the bandwidth needed to receive one program. In the case of the feature Picture in Picture, one of the two programs has to be reduced before the images of said program could be combined with the other program so as to obtain the PIP image.

Nowadays, service providers add additional video or still picture slide show content to a video signal to enhance their product. Examples are multi-angle feature and director commentary feature of DVD. In the first case one could view a scene from another direction. Both Digital TV systems and DVD support a multi-angle feature but in both cases the user must choose only one of the angles to view and all angles are included at full screen resolution.

It is an object of the invention to provide an arrangement for receiving a digital signal with improved interactivity so as to enhance video with additional video content.

The arrangement in accordance with the invention is characterized in that characterized in that the first video signal represents a sequence of images having a first size, and the second video signal representing a sequence of images having a second size, the second size being smaller then the first size of the images, the signal combination means being adapted to combine the first and second video signal while the size of the images corresponding to the second video signal remains unchanged. The size of an image could be defined in the number of horizontal and vertical pixels.

The invention is based on the following recognition. Up till now, the images of two video programs transmitted in the form of an MPEG transport stream via a record carrier or broadcast are full screen. In the event the two video programs are recorded on a record carrier they could be stored in two different transport streams. To be able to produce a PIP screen, both video programs has to be received completely and one of the programs has to be processed to obtain the PIP-images, which has a reduced size. In the event they are read from a record carrier, the reading head and input circuitry should be able to read and process both streams simultaneously or real-time. Therefore, these devices should have a high bandwidth. In optical reproducing devices this becomes critical. Furthermore, circuitry is needed to reduce the size of the images of one of the video programs. The images of the additional video signal to enhance a video program (main video) with multi-angle feature or "director's commentary" have a direct relationship with specific parts of said video program. These images have to be displayed simultaneously with the main video. Therefore, according to the invention the additional video signal is transmitted/recorded in a PIP-format. This has the advantage that it reduces the bandwidth needed to receive both the main video and the additional video information. Furthermore, no special hardware/software is needed to reduce images of the additional video signal prior to combining said reduced images with the main video so as to obtain the PIP-images.

This invention is a very advantageous feature for published discs as additional video content can be added to the main video program without changing the original video material. This additional video (or still picture slide show) content will be overlaid on top of the main video in a window that takes up usually only a small part of the screen. This feature can be used in many ways depending on the content. One example is an enhancement of the "director's commentary" feature of DVD. In this case, instead of only hearing the directors voice, you could also see the directors face, see storyboards or see 'making of' footage as the director explains the scene. For other types of content (e.g. documentaries, sports), the PIP feature can be used in different ways. The invention improves the interactivity with main video programs on a published disc.

A further embodiment of the arrangement according to the invention is characterized in that the digital information signal further comprises a parameter signal indicative for the location where the second video signal has to be overlaid on top of the first video signal, the apparatus further comprises third retrieval means for retrieving the parameter signal, the signal combination means further being adapted to overlay the second video signal on top of the first video signal in dependence of said parameter.

An advantage of such a parameter is that editors has the possibility to position the images of the second video signal in such a location in the images of the first video signal that the images of the second video signal only covers an un- or less important part of the images of the first video signal. In this way the viewer can see the relevant parts of the first video signal.

Figure 2:
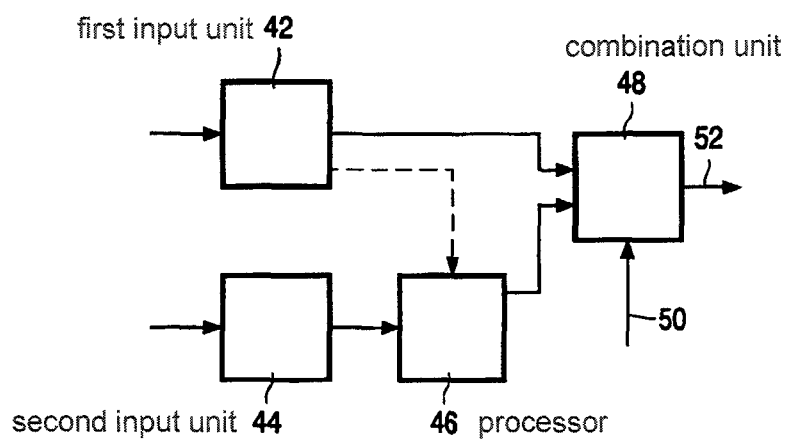

These and other aspects of the invention will be apparent from and elucidated by means of three embodiments with reference to the drawings in which Embodiments of the invention will now be described in more detail, by way of example, with reference to the drawings, in which FIG. 1 shows an arrangement for receiving a digital information signal in accordance with the invention, FIG. 2 shows an arrangement for providing a digital information signal in accordance with the invention.

FIG. 1 shows an apparatus 2 for receiving a digital information signal comprising a first and second video signal. The first video signal is the main video and the second video signal is the additional video content. The apparatus comprises a receiving unit 4 for receiving said digital information signal. The receiving unit could comprise a reading unit not shown, for reading the information signal from a record carrier, such as an optical disc 6. However, the receiving unit could also be connected to a reading unit or a set top box 8, which is capable of retrieving both the main video and the additional video content and to provide this information in said digital information signal to the apparatus 2. The digital information signal is preferable in the form of an MPEG transport stream. The main video is in full screen size and the additional content is in reduced size, the size of the PIP-window.

The apparatus further comprises a first retrieval unit 10 for retrieving the main video signal from the digital information signal and second retrieval unit 12 for retrieving the additional video content from the digital information signal. The main video signal and the additional video information are supplied to a signal combination unit 16. The signal combination means is arranged for combining the main video and the additional video content so as to obtain a composite video signal suitable for displaying on a display unit 18.

The main video is retrieved in full resolution or full size. The images of the additional video content are not in full size. When these images are displayed on a display without any scaling they will fill only a part of the screen. In other words the additional video content has a reduced resolution when displayed in full screen format. The signal combination unit is adapted to combine the first and second video signal without changing the size of images of the additional video content.

Preferably the second video stream is included along with the main video stream in the multiplex on a disc. The secondary video stream will have lower resolution than the original and will be displayed as a Picture in Picture. Preferably the additional video content is multiplexed with the main video.

To control this PIP feature there are two basic approaches, one is to define the PIP stream in the multiplex and the other is to define it in the metadata information (PlayList or ProgramInfo).

PlayLists are known from DVD. The PlayLists are shown to the user in the UI and the user can choose to play one. The PIP feature could be defined as a separate PlayList which the user can choose. To enable this the PlayList has to indicate the elementary streams to present. To enable this the PlayItem structure is extended to specify the Elementary Stream (indicates with program identifiers PIDs) to present and should allow indicating the PIP stream as well as the main video stream.

ProgramInfo structure is known from the Digital Video Recorder standard (DVR) and defines the audio and video PIDs in the recorded Transport Stream. This structure is preferably extended to specify that certain streams are intended as PIP streams. For example, each stream is specified using a StreamCodingInfo table, this could be extended to specify that a stream is a PIP stream and should be displayed over the main video if the user specifies it (and the system supports it).

In the Transport Stream the Programme Map Table indicates the elementary streams in the multiplex. Each stream has an associated stream type indicating if ifs audio or video and the coding type. In accordance to the invention the stream_type field allows PIP streams to be specified, for example, one of User Private values could be defined to indicate PIP streams (e.g. one for video and one for associated audio).

The user-data in the picture header should contain the following information:
 Size of the PIP (pixels hor/vert)
 Location of the PIP in the main picture (It should always be presented at a location where the Main picture does not contain valuable information e.g the ball/goal in a football game). The location information may also take into account different aspect ratios and display formats.
 The blending with the Main picture.
 the corresponding audio PID, to identify which audio stream in the transport stream has to be used.

The apparatus in FIG. 1 comprises further a third retrieval unit 14 for retrieving the user-data defined above. This data is supplied to the signal combination unit 16 to control the signal combination unit.

For a Program Stream the solution would be to reserve one (or more) of the video stream_ids for the PIP or indicate that that stream_id is intended as a PIP and should not be displayed as full screen video. Alternatively, reserved Stream_ids used in PES headers can be defined for PIP streams.

In another embodiment of the invention the first video signal is retrieved from a record carrier, such as an optical disc and the second video signal is retrieved from another storage medium. Said recording medium carrying the first video signal could comprise links (URL's) or other suitable indicators to the location of the second video signals. Said other storage medium carrying the second video signal could be an optical disc, or a medium, which is accessible via a wired or wireless connection, such as the internet or a network server. In this embodiment the apparatus comprises a receiving unit for receiving the first video signal and a control signal to enable said apparatus to retrieve the second video signal and another receiving unit for receiving the second video signal in dependence of said control signal. The control signal could comprises information where the apparatus can find the second video signal or could be an application, which offers the users a menu, this could be a WEB page, which enables a user to select a second video signal from several possible second video signals.

FIG. 2 shows an apparatus for providing a digital information signal in accordance to the invention. The apparatus comprises a first input unit 42 for receiving the main video and a second input unit 44 for receiving the video content to be added in full screen format or full resolution. The apparatus further comprises a video signal processing unit 46 arranged for reducing the size of the video content to be added so as to obtain video content in the form of PIP stream. The signal combination unit 48 combined the main video and the PIP stream so as to obtain the digital information signal, preferably in the form of an MPEG transport stream. The digital information signal could be transmitted or recorded on a record carrier, such as an optical disc.

Signal 50 could be supplied to the signal combination unit to include in the digital information signal the user data, identifying which streams are PIP streams and the location of the PIP window in the screen and other suitable PIP control information. Signal could by generated manually in a studio or automatically by image analysis tools. The analysis tools determined unimportant parts in the main video images. These unimportant parts are used to display the PIP window.

Though the invention is described with reference to preferred embodiments thereof, it is to be understood that these are non-limitative examples. Thus, various modifications are conceivable to those skilled in the art, without departing from the scope of the invention, as defined by the claims. Selecting the PIP feature may cause a different audio track to be presented (e.g. director's commentary) or it may leave the audio unchanged (e.g. reverse angle PIP in sports disc). The PIP feature may appear for only specific portions of the main video or it may be presented throughout the complete content.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

The invention claimed is:

1. An apparatus for receiving a digital information signal comprising at least a first video signal, a second video signal and a parameter signal, the apparatus comprises:
   a receiver configured to receive the digital information signal;
   a first retriever configured to retrieve the first video signal from the digital information signal;
   a second retriever configured to retrieve the second video signal from the digital information signal; and
   a combiner having three inputs for receiving the first video signal, the second video signal and the parameter signal, respectively, the combiner being configured to combine the first and second video signal so as to obtain a composite video signal suitable for displaying on a display unit,
   wherein the first video signal represents a first sequence of images having a first display size, and the second video signal representing a second sequence of images having a second display size, the second display size being smaller than the first display size of the images and having a reduced resolution lower than a resolution of the first video signal when displayed on a display unit in a full screen format,
   wherein the combiner is further configured to combine the first and second video signals while the display size of the images corresponding to the second video signal remains unchanged for display of the second video signal having the reduced resolution,
   wherein the digital information signal further comprises a playlist, and
   wherein the playlist includes an extended list including a stream type specifying a stream as being one of the first video signal and the second video signal having the second sequence of images of the second display size and the reduced resolution for forming the composite video signal for simultaneous display of the second sequence of images overlaid on the first sequence of images on the display unit when selected by a user.

2. The apparatus of claim 1,
   wherein the parameter signal is indicative of the location where the second video signal has to be overlaid on top of the first video signal, and
   the apparatus further comprises a third retriever configured to retrieve the parameter signal,
   wherein the combiner overlays the second video signal on top of the first video signal depending on the parameter signal.

3. The apparatus of claim 2, wherein the parameter signal comprises further information on combining the second video stream with the first video stream.

4. The apparatus of claim 2, wherein the parameter signal comprises information indicating the aspect ratios and display formats of the first and second video signals.

5. The apparatus of claim 1, wherein the digital information signal includes an MPEG transport stream comprising the first and second video signals.

6. The apparatus as claimed in claim 1, wherein the digital information signal is recorded on a record carrier, the receiver being configured to read the digital information signal from the record carrier.

7. The apparatus of claim 1, wherein the receiver receives the first video signal from a first source and receives the second video signal from a second source which is different from the first source.

8. An apparatus for receiving a first video signal, a second video signal and a parameter signal, the apparatus comprises:
   a first receiver configured to receive the first video signal and a control signal, the control signal enabling the apparatus to receive the second video signal;
   a second receiver configured to receive the second video signal depending on the control signal; and
   a combiner having three inputs for receiving the first video signal, the second video signal and the parameter signal, respectively, the combiner being configured to receive a playlist and combine the first and second video signal based on the playlist so as to obtain a composite video signal suitable for displaying on a display unit,
   wherein the first video signal represents a first sequence of images having a first display size, and the second video signal representing a second sequence of images having a second display size, the second display size being smaller than the first display size of the images and having a lower resolution than a resolution of the first video signal when displayed on the display unit in a full screen format,
   wherein the combiner is further configured to combine the first video signal and second video signal while the display size of the images corresponding to the second video signal remains unchanged for display of the second video signal having the lower resolution, and
   wherein the playlist includes an extended list including a stream type specifying a stream as being one of the first video signal and the second video signal having the second sequence of images of the second display size and the reduced resolution for forming the composite video signal for simultaneous display of the second sequence of images overlaid on the first sequence of images on the display unit when selected by a user.

9. An apparatus for receiving a first video signal and a second video signal, the apparatus comprises:
   a receiver configured to receive the first video signal and the second video signal, wherein the first video signal represents a first sequence of images having a first display size, and the second video signal representing a second sequence of images having a second display size, the second display size being smaller than the first display size of the images and having a lower resolution than a resolution of the first video signal when displayed on a display unit in a full screen format;
   a generator configured to receive a playlist and generate a parameter signal indicative of a location where the second video signal is to be overlaid on top of the first video signal;
   a combiner having three inputs for receiving the first video signal, the second video signal and the parameter signal, respectively, the combiner being configured to combine the parameter signal, and the first video signal, and the second video signal into digital information signal; and
   a writer configured to write the digital information signal to an information storage media,
   wherein the playlist includes an extended list including a stream type specifying a stream as being one of the first video signal and the second video signal having the second sequence of images of the second display size and the reduced resolution for forming the digital information signal for simultaneous display of the second sequence of images overlaid on the first sequence of images on the display unit when selected by a user.

10. A tangible computer readable storage-medium, that is not a transitory propagating signal or wave, comprising: a digital information signal, the digital information signal including a first video signal, a second video signal and a parameter signal, wherein the first video signal represents a first sequence of images having a first display size, and the second video signal represents a second sequence of images having a second display size, the second display size of the images being smaller than the first display size and having a lower resolution than a resolution of the first video signal when displayed on a display unit in a full screen format, wherein the digital information signal further comprises a playlist, and wherein the playlist includes an extended list including a stream type specifying a stream as being one of the first video signal and the second video signal having the second sequence of images of the second display size and the reduced resolution for forming the composite video signal for simultaneous display of the second sequence of images overlaid on the first sequence of images on the display unit when selected by a user, and wherein at reproduction the first video signal, the second video signal and the parameter signal are provided to three inputs of a combiner, respectively.

11. The medium of claim 10, wherein the parameter signal is indicative of the location where the second video signal has to be overlaid on top of the first video signal.

12. An apparatus for providing a digital information signal, the apparatus comprising:
an input configured to receive a first video signal and a second video signal, the first video signal representing a first sequence of images having a first display size, the second video signal representing a second sequence of images having a second display size,
a combiner having three inputs for receiving the first video signal, the second video signal and a control signal, respectively, the combiner being configured to combine the first and second video signal so as to obtain the digital information signal,
a writer configured to provide the digital information signal,
a processor configured to process the second video signal so as to obtain a processed second video signal representing a sequence of images having a second display size, the second display size being smaller than the first display size of the images and having a lower resolution than a resolution of the first video signal when displayed on a display unit in a full screen format,
wherein the combiner combines the first and processed second video signal so as to obtain the digital information signal,
wherein the digital information signal further comprises a playlist, and
wherein the playlist includes an extended list including a stream type specifying a stream as being one of the first video signal and the second video signal having the second sequence of images of the second display size and the reduced resolution for forming the digital information signal for simultaneous display of the second sequence of images overlaid on the first sequence of images on the display unit when selected by a user.

13. The apparatus of claim 12, wherein the writer is further configured to write the digital information signal on an optical information storage disc.

14. The apparatus of claim 12, further comprising a generator configured to generate the control signal for indicating a location where the second video signal is to be overlaid on top of the first video signal, wherein the combiner combines the control signal with the first and second video signal in forming the digital information signal.

15. The apparatus of claim 12, wherein the control signal comprises information where the apparatus can find the second video signal, and an application which offers users a menu to enables the user to select the second video signal from a plurality of second video signals.

16. An apparatus for receiving a digital information signal comprising an MPEG stream and a parameter signal, the MPEG stream comprising at least a first video elementary stream and a second video elementary stream, the apparatus comprises:
a receiver configured to receive the digital information signal;
a first retriever configured to retrieve the first video elementary stream from the MPEG stream;
a second retriever configured to retrieve the second video elementary stream from the MPEG stream;
a combiner having three inputs for receiving the first video signal, the second video signal, and the parameter signal, respectively, the combiner being configured to combine the first and second video elementary streams so as to obtain a composite video signal suitable for displaying on a display unit,
the first video elementary stream represents a first sequence of images having a first size, and the second video elementary stream represents a second sequence of images having a second size, the second size being smaller than the first size of the frames and having a lower resolution than a resolution of the first video signal when displayed on the display unit in a full screen format, the combiner being further configured to combine the first and second video elementary stream while the size of the images corresponding to the second video elementary stream remains unchanged,
wherein the parameter signal is indicative for the location where the second video elementary stream has to be overlaid on top of the first video elementary stream, and
wherein the apparatus further comprises a third retriever configured to retrieve the parameter signal, the combiner being further configured to overlay the second video elementary stream on top of the first video elementary stream in dependence of the parameter signal,
wherein the digital information signal further comprises a playlist, and
wherein the playlist includes an extended list including a stream type specifying a stream as being one of the first video signal and the second video signal having the second sequence of images of the second display size and the reduced resolution for simultaneous display of the second sequence of images overlaid on the first sequence of images on the display unit when selected by a user.

17. The apparatus of claim 16, characterized in that the MPEG stream is an MPEG transport stream.

18. The apparatus of claim 16, wherein the parameter signal further comprises information for taking into consideration aspect ratios and display formats.

19. The apparatus of claim 16, wherein the parameter signal further information on blending the second video elementary stream with the first video elementary stream.

20. The apparatus of claim 16, wherein the parameter signal is defined as metadata information.

21. The apparatus of claim 16, wherein the digital information signal is recorded on a record carrier, the receiver being further configured to read the digital information signal from the record carrier.

22. A tangible computer readable storage-medium, that is not a transitory propagating signal or wave, carrying a digital information signal, the digital information signal comprising an MPEG stream and a parameter signal,
the MPEG stream comprising a first video elementary stream and a second video elementary stream,
the first video elementary stream represents a first sequence of images having a first size, and the second video elementary stream represents a second sequence of images having a second size, the second size of the images being smaller than the first size,
wherein the parameter signal is indicative for the location where the second video elementary stream has to be overlaid on top of the first video elementary stream,
wherein the digital information signal further comprises a playlist,
wherein the playlist includes an extended list including a stream type specifying a stream as being one of the first video signal and the second video signal having the second sequence of images of the second display size and the reduced resolution for simultaneous display of the second sequence of images overlaid on the first sequence of images on a display unit when selected by a user, and
wherein at reproduction the first video elementary stream, the second video elementary stream and the parameter signal are provided to three inputs of a combiner, respectively.

23. The medium of claim 22, wherein the parameter signal further comprises information for taking into consideration aspect ratios and display formats.

24. The medium of claim 22, wherein the parameter signal further information on blending the second video elementary stream with the first video elementary stream.

25. The medium of claim 22, wherein the parameter signal is defined as metadata information.

26. An apparatus for providing a digital information signal, the digital information signal comprising an MPEG stream and a parameter signal,
wherein the apparatus comprises:
an input configured to receive a first video elementary stream and second video elementary stream, the first video elementary stream representing a first sequence of images having a first size,
a combiner having three inputs for receiving the first video elementary stream, the second video elementary stream and the parameter signal, respectively, the combiner being configured to combine the first video elementary stream and the second video elementary stream so as to obtain the MPEG stream,
a writer configured to provide the MPEG stream,
a processor configured to process the second video elementary stream so as to obtain a processed second video elementary stream representing a second sequence of images having a second size, wherein the second size being smaller than the first size of the images, the combiner being further configured to combine the first video elementary stream and the processed second video elementary stream so as to obtain the MPEG stream,
wherein the parameter signal is indicative for a location where the processed second video elementary stream has to be overlaid on top of the first video elementary stream, wherein the parameter is settable by an editor of the digital information signal for providing a viewer with the second video elementary stream at the location that allows the viewer to see relevant parts of the first video elementary stream as determined by the editor,
wherein the digital information signal further comprises a playlist, and
wherein the playlist includes an extended list including a stream type specifying a stream as being one of the first video signal and the second video signal having the second sequence of images of the second display size and the reduced resolution for forming the MPEG stream for simultaneous display of the second sequence of images overlaid on the first sequence of images on a display unit when selected by a user.

27. The apparatus of claim 26, wherein writer is further configured to write the digital information signal on a record carrier.

28. An apparatus for reading signals from a record carrier; the record carrier comprising a first elementary stream consisting of a plurality of first images having a first size, a second elementary stream consisting of a plurality of second images having a second size which is smaller than the first size and having a lower resolution than a resolution of the first elementary stream when displayed in a full screen format on a display unit, a parameter signal, and a playlist specifying the first elementary stream as a main stream and specifying the second elementary stream as a picture-in-picture streams to be displayed over the main stream; the apparatus comprising:
a first retriever configured to retrieve the first elementary stream from the record carrier;
a second retriever configured to retrieve the second elementary stream from the record carrier; and
a combiner having three inputs for receiving the first video signal, the second video signal and the parameter signal, respectively, the combiner being configured to combine the first elementary stream and the second elementary stream according to the playlist so as to obtain a composite video signal suitable for displaying on the display unit;
wherein the a combiner is further configured to combine the first elementary stream and the second elementary stream while keeping the second size of the plurality of second images unchanged,
wherein the digital information signal further comprises the playlist, and
wherein the playlist includes an extended list including a stream type specifying a stream as being one of the first elementary stream and the second elementary stream having the second images of the second display size and the reduced resolution for forming the composite video signal for simultaneous display of the second images overlaid on the first images on the display unit when selected by a user.

29. The apparatus of claim 28, wherein the parameter signal is indicative for the location where the images constituting the second elementary stream have to be overlaid on the images constituting the first elementary stream, the apparatus further comprising a third retriever configured to retrieve the parameter signal, the combiner being further configured to overlay the images constituting the second elementary stream on the images constituting the first elementary stream in dependence on the parameter signal.

30. The apparatus of claim 28, wherein the first elementary stream and the second elementary stream constitute an MPEG transport stream.

31. The apparatus of claim 28 further comprising a selector for allowing the user to select whether or not to display the images constituting the second elementary stream overlaid on the images constituting the first elementary stream.

32. The apparatus of claim 31, wherein
the record carrier comprises an audio track for the first elementary stream and an audio track for the second elementary stream; and wherein
the apparatus further comprises:
a speaker configured to output the audio track for the second elementary stream together with overlaid display of the images constituting the second elementary stream if the user selects carrying out the overlaid display via the selector.

33. A tangible computer readable medium, that is not a transitory propagating signal or wave, including digital information comprising:
a first elementary stream consisting of a plurality of first images having a first size;
a second elementary stream elementary stream consisting of a plurality of second images having a second size which is smaller than the first size;
a parameter signal; and
a playlist including an extended list having a stream type specifying the first elementary stream as a main stream and specifying the second elementary stream as a picture-in-picture stream to be displayed over the main stream on a display unit when selected by a user, the playlist being provided for access by a combiner for combining the main stream and the picture-in-picture stream to form a composite signal for display on the display unit the picture-in-picture stream overlaid on the main stream in accordance with the playlist, wherein at reproduction the first elementary stream, the second elementary stream and the parameter signal are provided to three inputs of a combiner, respectively.

34. The non-transitory computer readable medium of claim 33, the parameter signal is indicative for the location where the images constituting the second elementary stream have to be overlaid on the images constituting the first elementary stream.

35. The non-transitory computer readable medium of claim 33, wherein the first elementary stream and the second elementary stream constitute an MPEG transport stream.

36. The non-transitory computer readable medium of claim 33, the digital information further comprising an audio track for the first elementary stream and an audio track for the second elementary stream.

37. A method for receiving a digital information signal comprising at least a first video signal, a second video signal, and a parameter signal, the method comprising the acts of:
a receiver receiving the digital information signal;
a first retriever, retrieving the first video signal from the digital information signal;
a second retriever, retrieving the second video signal from the digital information signal; and
a combiner receiving the first video signal, the second video signal and the parameter signal, from three inputs respectively, the combiner, combining the first and second video signal so as to obtain a composite video signal suitable for displaying on a display unit,
wherein the first video signal represents a first sequence of images having a first display size, and the second video signal representing a second sequence of images having a second display size, the second display size being smaller than the first display size of the images and having a reduced resolution lower than a resolution of the first video signal when displayed on a display unit in a full screen format,
wherein the combiner combines the first and second video signals while the display size of the images corresponding to the second video signal remains unchanged for display of the second video signal having the reduced resolution,
wherein the digital information signal comprises a playlist, and
wherein the playlist includes an extended list including a stream type specifying a stream as being one of the first video signal and the second video signal having the second sequence of images of the second display size and the reduced resolution for forming the composite video signal for simultaneous display of the second sequence of images overlaid on the first sequence of images on the display unit when selected by a user.

38. A method for reading and processing signals from a record carrier; the method comprising the steps of:
at least one retriever retrieving from the record carrier: a first elementary stream consisting of a plurality of first images having a first size, a second elementary stream consisting of a plurality of second images having a second size which is smaller than the first size and having a lower resolution than a resolution of the first elementary stream when displayed in a full screen format on a display unit, a parameter signal of control parameters to control the processing of the first and second elementary streams, and a playlist specifying the first elementary stream as a main stream and specifying the second elementary stream as a picture-in-picture streams to be displayed over the main stream;
a combiner having three inputs receiving the first video signal, the second video signal and the parameter signal, respectively, the combiner combining the first elementary stream and the second elementary stream according to the playlist so as to obtain a composite video signal suitable for displaying on the display unit; and while keeping the second size of the plurality of second images unchanged,
wherein the playlist includes an extended list including a stream type specifying a stream as being one of the first elementary stream and the second elementary stream having the second images of the second display size and the reduced resolution for forming the composite video signal for simultaneous display of the second images overlaid on the first images on the display unit when selected by a user.

* * * * *